United States Patent

Shimokusuzuno et al.

[11] Patent Number: 5,837,767
[45] Date of Patent: Nov. 17, 1998

[54] STRIPPING FINGERS

[75] Inventors: Takumi Shimokusuzuno, Inabe-gun; Tomomi Nakamichi, Yokkaichi; Hiroshi Niwa, Kuwana, all of Japan

[73] Assignee: NTN Corporation, Osaka, Japan

[21] Appl. No.: 845,032

[22] Filed: Apr. 21, 1997

Related U.S. Application Data

[63] Continuation of Ser. No. 502,421, Jul. 14, 1995, abandoned.

[30] Foreign Application Priority Data

| Oct. 31, 1994 | [JP] | Japan | 6-267254 |
| Dec. 27, 1994 | [JP] | Japan | 6-325712 |
| Feb. 28, 1995 | [JP] | Japan | 7-040603 |

[51] Int. Cl.$^6$ .............. C08G 73/10; C08K 3/22
[52] U.S. Cl. .......... 524/497; 524/413; 524/227; 524/230; 525/432; 525/436; 528/353; 528/350; 528/229; 428/323; 428/327
[58] Field of Search ............... 524/497, 413, 524/227, 230; 425/432, 436; 528/353, 350, 229; 428/323, 327

[56] References Cited

U.S. PATENT DOCUMENTS

| 4,340,697 | 7/1982 | Aya et al. | 525/397 |
| 5,089,628 | 2/1992 | Maruta et al. | 548/520 |
| 5,141,982 | 8/1992 | Oku et al. | 524/432 |
| 5,183,594 | 2/1993 | Yoshinaka et al. | 252/518 |
| 5,380,805 | 1/1995 | Tamai et al. | 525/432 |
| 5,380,820 | 1/1995 | Ohta et al. | 528/125 |
| 5,434,210 | 7/1995 | Rangaswamy et al. | 524/497 |
| 5,459,233 | 10/1995 | Tamai et al. | 528/350 |
| 5,518,781 | 5/1996 | Nakamura et al. | 428/1 |

*Primary Examiner*—Vasu Jagannathan
*Assistant Examiner*—Olga Asinovsky
*Attorney, Agent, or Firm*—Nikaido Marmelstein Murray & Oram, LLP

[57] ABSTRACT

Stripping fingers for use in a copying machine formed from a resin composition comprising 50–90% by weight of a thermoplastic polyimide resin, and 10–50% by weight of titanium oxide whiskers or zinc oxide whiskers. They may be formed from a resin composition comprising 50–80% by weight of a thermoplastic polyimide resin, 10–40% by weight of titanium oxide whiskers or zinc oxide whiskers, and 2–15% by weight of aromatic polyamide resin powder. They are injection-molded from a matrix of a polyimide resin and the fingers have excellent heat resistance, wear resistance end fatigue resistance,

15 Claims, 4 Drawing Sheets

STRIPPING FINGERS

This application is a continuation of application Ser. No. 08/502,421 filed Jul. 14, 1995 now abandoned.

BACKGROUND OF THE INVENTION

This invention relates to stripping fingers for use in a copying machine.

A copying machine has an image fixing unit in which statically charged latent images formed on a sensitizing drum, which may represent letters or figures, are converted to toner images, which are then transferred onto a sheet of paper supplied from a paper feeding cassette. The toner images transferred onto the paper are pressed and heated by a heated fixing roller until the toner images and the paper fibers are fused together.

In order to smoothly discharge the sheet of paper, now carrying toner images, without getting caught by the roller at the fixing unit, the leading end of the sheet is scooped up by stripping fingers having their tips kept in contact with the roller surface.

Such stripping fingers have to be low in frictional resistance so that they will not damage the surface of the roller, and also have to have a sufficiently high mechanical strength, especially high-temperature rigidity, so that their edges, especially their edge tips, will not be deformed even slightly while in use. Further, it is necessary to form such stripping fingers from a material to which toners are less likely to adhere.

Since today's copiers are operated at increasingly high speed, their fixing rollers tend to be heated to increasingly high temperatures. Thus, stripping fingers used in cooperation with such fixing rollers have to be capable of withstanding rather high temperatures on the order of 250° C., or sometimes higher than 300° C.

Polyimide resins are well-known as heat-resistant resins. But these resins are so brittle that their thermal shock resistance is low. Furthermore, these resins have such high melting points that they are practically insoluble in solvents. Thus, it is very difficult to form such resins into desired shape.

For example, a polyimide resin having a basic structure expressed by the following formula 4 (KAPTON, VESPEL made by Du Pont) has no clear glass-transition temperature and thus has a high heat-resistance. But this resin is so low in formability that it is difficult to injection-mold it. Namely, it was impossible, in a practical sense, to form stripping fingers from this resin.

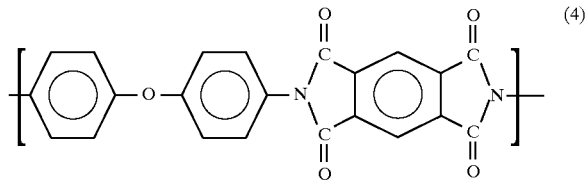
(4)

However, an injection-moldable polyimide resin having improved formability has been developed, and it was actually proposed to form stripping fingers from this resin (unexamined Japanese Patent Publication 1-257884).

Stripping fingers formed from this polyimide resin are not necessarily satisfactory in wear resistance. It was therefore tried to increase their wear resistance by adding a filler such as potassium titanate fiber. But if the content of such a filler is too high, formability of the resin, especially injection-moldability, will drop markedly. Also, wear resistance is not improved fully.

Also, stripping fingers formed of conventional polyimide resins are too low in shock resistance and fatigue resistance under high-temperature conditions, so that they may "chip" after repeatedly colliding with rollers heated to high temperatures or suffer deformation due to fatigue which may result from repeated loads applied to the stripping fingers.

One well-known solution to these problems is to add aluminum borate whiskers or potassium titanate whiskers to the resin as a general-purpose fibrous reinforcing material. Stripping fingers formed of this polyimide resin containing such reinforcing material have a problem in that the tips of the fingers tend to have a low content of reinforcing material, so that their tips are not strengthened sufficiently.

An object of this invention is to provide stripping fingers for use in a copying machine which are injection-molded from a matrix of a polyimide resin and whose tips have excellent heat resistance, wear resistance, shock resistance and fatigue resistance.

SUMMARY OF THE INVENTION

According to this invention, there are provided stripping fingers for use in a copying machine formed from a resin composition comprising 50–95% by weight of a thermoplastic polyimide resin, and 5–50% by weight of titanium oxide whiskers or zinc oxide whiskers.

From another aspect of the invention, there are provided stripping fingers for use in a copying machine formed from a resin composition comprising 50–80% by weight of a thermoplastic polyimide resin, 10–40% by weight of titanium oxide whiskers or zinc oxide whiskers, and 2–15% by weight of aromatic polyamide resin powder.

The thermoplastic polyimide resin may be a polyimide resin having a repeating unit represented by the following formula 1, a polyetherimide resin having a repeating unit represented by the following formula 2, or a polyamideimide resin having a repeating unit represented by the following formula 3. But for higher heat resistance, the polyamide resin represented by Formula 1 is more desirable.

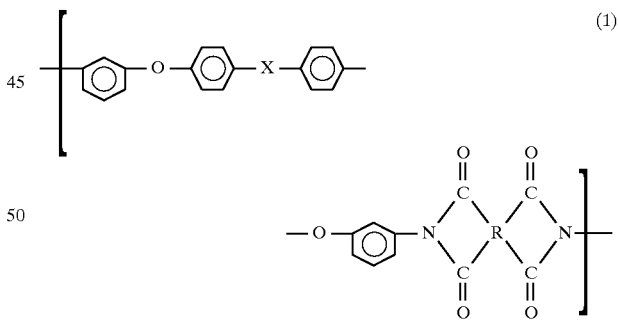

(where X indicates direct bonding or a bivalent group selected from the group consisting of a bivalent hydrocarbon group having 1–10 carbon atoms, a hexafluorinated isopropylidene group, a carbonyl group, a thio group, and a sulfonic group; and R indicates a tetravalent group selected from the group consisting of an aliphatic group having two or more carbon atoms, a cyclic aliphatic group, a monocyclic aromatic group, a condensed polycyclic aromatic group, a non-condensed polycyclic aromatic group made up of aromatic groups coupled together directly or through crosslinking agents)

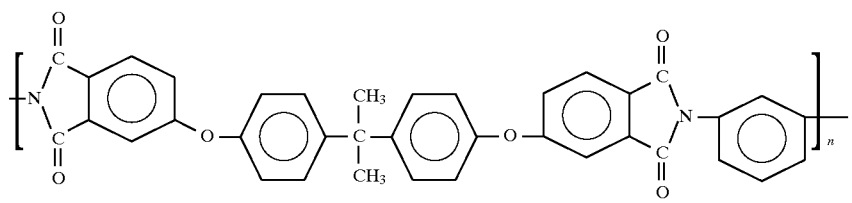

(2)

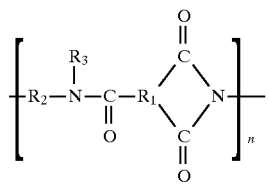

(3)

The term "thermoplastic polyimide resins" used in the specification refers to all kinds of injection-moldable imide polymers, i.e. polymers having an adequate melt viscosity though containing imide bonds in their backbone chains. The imide bonds as represented by Formula 5 have excellent heat resistance and heat decomposition properties. Thus, such a polymer is especially suitable as a material for stripping fingers used at portions where they are exposed to high temperatures such as image fixing portions of copiers. Specifically, such polymers contain, in addition to imide groups as represented by Formula 5, amide bonds as represented by Formula 6 so as to impart these polymers injection-moldability. "TORLON" made by Amoco in U.S.A. is one of such polyamide-imide resins. Among the polymers containing units represented by formula 7 and imide groups, it is possible to use those containing more than one ether bonds in each repeating unit. For example, such a polymer has two or more portions represented by Formula 7 in which ether bonds are surrounded by two aromatic rings. Preferably, for high heat resistance, such a polymer has the structure represented by Formula 9. The polymer will soften if energy such as heat is applied to the ether-bonded portions or the amide-bonded portions. This is presumably the reason why the polymer converts to an imide polymer having thermoplastic properties.

This resin composition may further comprise 3–30% by weight of a solid lubricant.

It is especially preferable to form stripping fingers from a resin composition comprising 50–95% by weight of a thermoplastic polyimide resin having a repeating unit represented by the following formula 1, 5–50% by weight of titanium oxide whiskers or zinc oxide whiskers, and 3–30% by weight of solid lubricants so that the total amount of the solid lubricants and titanium oxide whiskers or zinc oxide whiskers will be 10–60% by weight of the entire resin composition.

Preferably, fluororesin coatings may be provided on the stripping fingers thus formed.

The resin composition may further comprise 3–30% by weight of a filler having a heat decomposition temperature higher than the melting point of the abovementioned thermoplastic polyimide resin.

Such a filler may be either a thermosetting resin or a thermoplastic resin. Fluororesin especially preferable.

From another aspect of the invention, there is provided a method of manufacturing stripping fingers for a copying machine, said method comprising the steps of injection-molding the aforementioned resin composition in to the shape of stripping fingers, and heating the molding thus formed to 200°–340° C., or preferably 250°–340° C., thereby increasing the density of the polyimide resin by 1.5% or more.

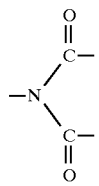

(5)

(6)

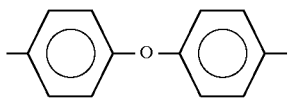

(7)

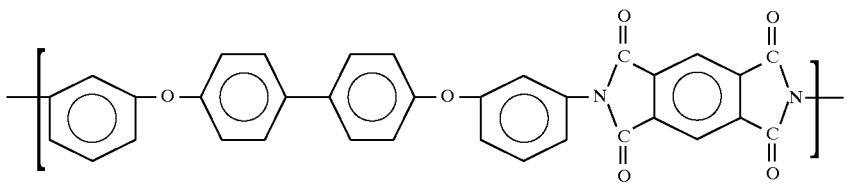

(9)

We will discuss the present invention in more detail.

The polyimide resins used in the present invention may include a polyimide disclosed in Unexamined Japanese Patent Publication 63-8455 which is obtained by reacting an ether diamine with one or more tetracarboxylic acid dianhydride.

The ether diamine used in the present invention may be bis(4-(3-aminophenoxy)phenyl)methane, 1,1-bis(4-(3-aminophenoxy)phenyl ethane, 1,2-bis(4-(3-aminophenoxy)phenyl ethane, 2,2-bis(4-(3-aminophenoxy)phenyl propane, 2,2-bis(4-(3-aminophenoxy)phenyl butane, 2,2-bis(4-(3-aminophenoxy)phenyl)1,1,1,3,3,3-hexafluoropropane, 4,4'-bis(3-aminophenoxy)biphenyl, bis(4-(3-aminophenoxy)phenyl)ketone, bis(4-(3-aminophenoxy)phenyl)sulfide, bis(4-(3-aminophenoxy)phenyl)sulfoxide, bis(4-(3-aminophenoxy)phenyl)sulfone, bis(4-(3-aminophenoxy)phenyl)ether, or a mixture thereof.

The tetracarboxylic acid dianhydrides used may include ethylenetetracarboxylic acid dianhydrides, cyclopentanetetracarboxylic acid dianhydrides, pyromellitic acid dianhydrides, 3,3',4,4'-benzophenonetetracarboxylic acid dianhydrides, 2,2',3,3'-benzophenonetetracarboxylic acid dianhydrides, 3,3',4,4'-biphenyltetracarboxylic acid dianhydrides, 2,2',3,3'-biphenyltetracarboxylic acid dianhydrides, 2,2-bis(3,4-dicarboxyphenyl)propane dianhydrides, 2,2-bis(2,3-dicarboxyphenyl)propane dianhydrides, bis(3,4-dicarboxyphenyl)ether dianhydrides, bis(3,4-dicarboxyphenyl)sulfone dianhydrides, 1,1-bis(2,3-dicarboxyphenyl)ethane dianhydrides. bis(2,3-dicarboxyphenyl)methane dianhydrides, bis(3,4-dicarboxyphenyl)methane dianhydrides, 2,3,6,7-naphthalenetetracarboxylic acid dianhydrides, 1,4,5,8-naphthalenetetracarboxylic acid dianhydrides, 1,2,5,6-naphthalenetetracarboxylic acid dianhydrides, 1,2,3,4-benzenetetracarboxylic acid dianhydrides, 3,4,9,10-perylenetetracarboxylic acid dianhydrides, 2,3,6,7-anthracenetetracarboxylic acid dianhydrides, and 1,2,7,8-phenanthrenetetracarboxylic acid dianhydrides.

They may be used singly or in the form of a mixture.

Ether diamines and tetracarboxylic acid dianhydrides are reacted by a known method to form a polyamide acid and then a polyimide.

Typical polyimide resins represented by the formula 1 are obtained by combining 4, 4'-bis (3-aminophenoxy) biphenyl and pyromellitic acid dianhydride into an imide compound. These resins show thermoplasticity and are injection-moldable or otherwise melt-formable. Of these resins, those in which X in the formula is direct bonding and R is a monocyclic aromatic group, i.e. polyimide resins represented by the formula 9 are sold e.g. in the name of AURUM or New-TPI by Mitsui Toatsu Chemical.

The thermoplastic polyimide used in the present invention may be a polyetherimide resin (melting point: about 350°–370° C.) represented by formula 2 (hereinafter abbreviated PEI) or polyamideimide resin (melting point: about 280°–290° C.) represented by Formula 3 (hereinafter abbreviated PAI).

As is apparent from its structural formula, a polyether imide has as its essential bonding units ether bonds and imide bonds. Namely, it is a thermoplastic polymer whose structure is determined by how these bonds are combined. It can be manufactured by the method disclosed in Examined Japanese Patent Publication 57-9372. One such resin is commercially available from General Electric in the name of ULTEM.

Titanium oxide whiskers used in this invention have a rutile type white needle-like crystalline structure represented by $TiO_2$. Their average fiber diameter and average fiber length should preferably be 0.05–3 μm and 1–100 μm, respectively, and most preferably 0.05–0.5 μm and 1–30 μm, respectively.

In order to increase the reinforcing effect of the titanium oxide whiskers, which is an effective way to improve the wettability and coupling strength between the titanium oxide whiskers and the matrix of polyimide resin is by surface-treating the polyimide resin with a coupling agent. Such a coupling agent may be a silicon, titanium, aluminum, zirconium, zirco-aluminum, chromium, boron, phosphorous or amino compound.

As shown in FIGS. 1A, 1B, each of the zinc oxide whiskers used in the present invention comprises four radial, tapered needles. Such zinc oxide whiskers are sold by Matsushita AMTEC under the trade name of PANATETRA.

Zinc oxide whiskers such as ZnO whiskers can be manufactured by vaporizing metallic zinc and oxidizing in a vapor phase at high temperatures (e.g. more than about 1000° C.) while keeping the zinc concentration to a high level (i.e. more than about 4%). Under such conditions, the grain diameter of the metallic zinc increases rapidly, so that zinc oxide whiskers form.

It is presumed that 40–60% of such zinc oxide whiskers are broken into needles as shown in FIG. 1B while the resin is kneaded and molded. Such tapered needles are less likely to be pulled out of the resin even if they fire exposed to the sliding surface. Also, they tend to be orientated and move to the finger tips, so that they can effectively reinforce the finger tips. For this reason, each needle forming the zinc oxide whiskers should preferably be 2–50 μm long and 0.2–3 μm in diameter.

The pH of such zinc oxide whiskers should not exceed 8. If higher than 8 in pH, the polyimide will decompose easily, making injection-molding difficult. In order to further increase the reinforcing effect by the zinc oxide whiskers, it is effective to improve the wettability and bonding strength between the zinc oxide whiskers and the matrix of polyimide resin by surface-treating the polyimide resin with a coupling agent. Such a coupling agent may be an amino silane or an epoxy silane.

The content of titanium oxide whiskers or zinc oxide whiskers in the resin composition should be 5–50% by weight, preferably 10–50% by weight, preferably 10–40% by weight (if aromatic polyamide resin powder is further added). If less than 5% or 10% by weight, it would be impossible to sufficiently reinforce the resin composition. If more than 50% by weight, it would be difficult to uniformly blend the two materials. The resulting resin composition would be too low in flowability to form into a desired shape.

The aromatic polyamide resin (hereinafter referred to as "aramid resin") powder used in this invention is a resin having a repeating unit expressed by the formula 8 below. Typical aramid resins having a meta molecular structure include NOMEX (paper form) made by DU Pont; and CONEX, made by Teijin. Those having a para molecular structure include KEVLAR (fibrous) made by Du Pont; and TECHNORA made by Teijin.

(8)

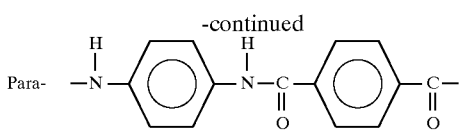

If a para type aramid resin is added to the composition, since its-molecular chains are orientated axially, it shows high resiliency and strength in the axial direction but is low in intermolecular force in a direction normal to the axis. Since a para type aramid resin has high axial strength, it increases the wear resistance of the entire resin composition. But its molecular chains are easily buckled or broken under a compressive force in a direction normal to the axis. Thus, such resin composition would not damage any soft mating member with which it is brought into sliding contact.

If a non-para type aramid resin is used, the fluororesin to be added to the resin composition should contain a predetermined amount of tetrafluoroethylene so that the resin composition will be sufficiently resistant to wear and at the same time would not damage any soft mating member.

Also, a different type of fluororesin may be further added to the composition. Such aremid resin should have a fiber length of about 0.15–3 mm and an aspect ratio of about 1–230.

The aramid resin used in this invention may be powdery or a powdered resin. The use of a fibrous aramid resin is not favorable because it tends to damage the mating surface by the fibers sticking out of the resin composition like a brush.

Preferably, the aramid resin powder should have an average grain diameter of about 5–50 $\mu$m. If less than 5 $\mu$m, the wear resistance of the resin composition would not be good. If larger than 50 $\mu$m, the composition might damage the mating member. One of the commercially available powdery alamid resins that satisfy this requirement is Aramica ARP-P (average particle diameter=20 $\mu$m) made by ASAHI KASEI.

The aramid resin powder should be added in a proportion of 2–15% by weight of the entire composition. If less than 2% by weight, the wear resistance will be insufficient. If over 15% by weight, its flowability will drop to a level at which forming is difficult.

Besides titanium oxide whiskers and zinc oxide whiskers, the polyimide resin composition may contain such additives as single-needle type fillers (as shown in FIG. 2) such as potassium titanium whiskers, graphite, fluoride resins such as polytetrafluoroethylene (hereinafter referred to as PTFE), molybdenum disulfide, graphite fluoride, lead monoxide, and other solid lubricants. Graphite has a high heat decomposition temperature and a sublimation temperature of about 3300°–3600° C.

Such solid lubricants should preferably be in powder form and capable of withstanding the forming temperature of the polyimide resin used. They should have a particle diameter of 0.1–800 $\mu$m, preferably 10–500 $\mu$m for good formability.

By adding graphite and/or fluororesins, it is possible to markedly reduce the wear resistance of the stripping fingers against the roller and thus the attack on the rollers.

The content of such solid lubricant should be 3–30% by weight, preferably 5–30%, or 3–10% (according to molecular structure of polyimide resin) of the entire resin composition. If less than 3% by weight, the wear resistance of the composition and the attack on the mating roller would not decrease sufficiently. The addition of more than 30% by weight of solid lubricants will lead to marked reduction in the flowability of the composition and also in the resistance to heat deformation of the product formed.

The total amount of solid lubricants and titanium oxide whiskers or the total amount of solid lubricants and zinc oxide whiskers in the composition should be 10–60% by weight of the entire composition. If it exceeds 60% by weight, which means that the content of polyimide resin in the composition is less than 40% by weight, uniform composition would not be obtainable. Further, the flowability of the resin will decrease, making forming difficult. If less than 10% by weight, it is impossible to reinforce the composition sufficiently.

If graphite as a solid lubricant is added to the composition to minimize the adhesion of toners to the stripping fingers, it should be added by 3–30% by weight, preferably 5–30% by weight, more preferably 10–25% by weight. If less than 5% by weight, the expected result will scarcely appear. Addition of more than 30% by weight of graphite will have unfavorable effect on the melt forming properties.

In one arrangement of the invention, stripping fingers are formed from a resin composition comprising 50–80% by weight of a thermoplastic polyamide resin having a repeating unit expressed by formula 1, 10–40% by weight of zinc oxide whiskers, 2–15% by weight of aromatic polyamides resin powder, and solid lubricants. In this case, the content of solid lubricants should be 3–10% by weight. It is also possible to replace the thermoplastic polyimide represented by formula 1 with the polyetherimide represented by formula 2 and the zinc oxide whiskers with titanium oxide whiskers. In this case, too, the contents of the components are the same as above and the content of solid lubricants should be 3–10% by weight.

If less than 3% by weight, the wear resistance of the composition and the attack on the mating roller would not decrease sufficiently. The addition of more than 10% by weight of solid lubricants will lead to marked reduction in the flowability of the composition and in the resistance to heat deformation of the product formed.

The total amount of solid lubricants, aramid resin powder, and zinc oxide whiskers or titanium oxide whiskers should be 10–60% by weight, preferably 12–50% by weight of the entire composition. If over 60% by weight, uniform composition would not be obtainable. Further, the flowability of the resin will decrease, making forming difficult. If less than 10% by weight, it is impossible to reinforce the composition sufficiently and also improve its friction properties and wear resistance sufficiently.

A filler used in this invention, i.e. a filler having a heat decomposition temperature higher than the melting point of the polyimide resin may be either a thermosetting resin or a thermoplastic resin having such a heat-decomposition temperature.

The heat decomposition temperature can be measured by weight analysis. More specifically, it is calculated from a thermobalance weight reduction curve (TG) and a derivative thermal analysis curve (DTA) obtained by a thermal analysis method (such as DSC, DTA, TGA). For example, this temperature may be given as the temperature at which the weight of a specimen (initial weight=15 mg) decreases by 5 mg or by about 5% when it is heated in the air or in nitrogen gas while increasing the temperature fit a rate of about 10° C./min, or the temperature at which the weight of the specimen decreases by about 50% by weight. This temperature is regarded as a derivative heat decomposition starting temperature.

Thermosetting resins having heat decomposition temperatures within the above-defined range include phenolic resins, urea resins, milamine resins, unsaturated polyester resins, diallyl phthalate resins, epoxy resins, silicon resins, polyurethane resins, furan resin, and polyimide resins. Polyimide resins include condensed polyimide resins, and addition type polyimide resins such as bismaleimide resins, end nasic acid resins, and acetylene resins.

Of the above-listed thermosetting resins, phenolic resins are especially preferable because they are fairly superior in various physical properties including mechanical properties, heat resistance, cold resistance, dimensional stability, solvent resistance, acid resistance, and water resistance, and cost performance. They are especially high in the ability to maintain their mechanical strength at high temperatures. Namely, their derivative heat decomposition starting temperature is about 405° C.

Of these phenolic resins, novolac resins are most generally used as forming materials because of their relatively high formability. Resol resins show higher thermal shock resistance than novolac resins. One-stage forming materials of resol type require a longer forming time and are slower in hardening speed than two-stage ones.

Aside from phenolic resins, epoxy resins, silicon resins and polyimide resins have derivative heat composition start temperatures of about 390° C., about 505° C. and about 400°–550° C., respectively. Thus, if these resins have excellent mechanical strength at high temperatures, they can be used as materials for the stripping fingers according to the present invention. Such forming materials should have a derivative heat decomposition starting temperature of about 390° C. or higher, preferably about 400° C. or higher, because such resins are less likely to be heat-decomposed when pelletized by a twin-screw melt extruder at about 390°–400° C., when injection-molded with a cylinder heated to about 390°–400° C., when heated at about 250°–340° C. thereafter, and when baked at about 340° C. for coating (in the case of PFA resins).

In view of this fact and further in consideration for safety, the filler may have a heat decomposition temperature about 10°–20° C. higher than the melting point of the thermoplastic polyimide resin. For higher safety, such temperature may be higher by about 30°–50° C. than the melting point of the thermoplastic polyimide resin.

By adding such thermosetting resins in the amount of 3–30% by weight, preferably 5–30% by weight, more preferably 5–15% by weight, it is possible to improve the shock resistance and wear resistance of stripping fingers at their tips.

If the addition amount is less than 5% by weight, the shock resistance, wear resistance and heat resistance will improve little. If more than 30% by weight, the polyimide resin tends to thermoset in the cylinder if it is melted for injection molding by heating the cylinder to a rather high temperature such as about 390°–450° C. This makes it difficult to achieve stable pelletizing properties, injection-moldability, and dimensional accuracy.

On the other hand, the thermoplastic resin used in the present invention may be typically selected from the following fluororesins. The figures in ( ) indicate heat decomposition temperatures. The figures in second bracket do the melting point.

1. Polytetrafluoroethylene (PTFE), (about 508°–538° C.) (about 327° C.)
2. Tetrafluoroethylene-perfluoroalkylvinylether copolymer (PFA), (about 464° C. or above) (about 302°–310° C.)
3. Tetrafluoroethylene-hexafluoropropylene copolymer (FEP), (about 419° C. or above) (about 270°–275° C.)
4. Polychlorotrifluoroethylene (PCTFE), (about 347°–418° C.) (about 210°–220° C.)
5. Tetrafluoroethylene-ethylene copolymer (ETFE), (about 347° C. or above) (about 260°–270° C.)
6. Chlorotrifluoroethylene-ethylene copolymer (ECTFE), (about 330° C. or above) (about 245° C.)
7. Polyvinylidene fluoride (PVDF), (about 400°–475° C.) (about 156°–180° C.)
8. Polyvinyl fluoride (PVF), (about 372°–480° C.) (about 195°–205° C.)
9. Tetrafluoroethylene-hexafluoropropylene-perfluoroalkylvinylether copolymer (EPE), (about 440° C. or above) (about 295° C.)

Also, as thermoplastic resins, fluoropolyolefins such as copolymers and ternary copolymers of the above-listed fluororesins may be used. Copolymers may be more than one copolymer containing a monomer of the abovementioned fluororein at the rate of about 1:10 to 10:1. They reveal properties similar to solid lubricants. Among these resins, PTFE is the most preferable because it has excellent heat resistance, chemical resistance, non-tackiness, and low friction coefficient.

Perfluororesins such as PTFE, PFA and FEP have especially high heat resistance and chemical resistance, excellent non-tackiness, and low friction coefficient. This is because these resins have all of their skeleton-forming carbon atoms surrounded with fluorine atoms or a trace amount of oxygen atoms, so that the C—F bonds are exceptionally strong.

The above-listed fluororesins are also preferable because they have relatively high derivative heat decomposition starting temperatures. For example, PTFE and PVDF have decomposition points of about 490° C. and about 350° C., respectively. Their derivative heat decomposition starting temperatures reach as high as about 555° C. and 460° C., respectively. Among perfluororesins, PTFT, PFA and FEP are especially preferable because they show excellent high-temperature properties.

Thus, these resins can withstand the abovementioned various heat histories to which they are subjected when forming stripping fingers by melting polyimides. PTFE is especially preferable because its decomposition point is higher than the melting point of the polyimide resin used. By adding these thermoplastic resins by 3–30% by weight, preferably 5–30% by weight, more preferably 5–15% by weight, it is possible to reduce the attack of tip of the stripping fingers on the surface of the fixing roller and. to improve their shock resistance, fatigue resistance and wear resistance.

If the amount is less than 5% by weight, the abovementioned effects will scarcely appear. If more than 30% by weight, their high melt viscosity will increase the load on the cylinder of the melt former or the like-when pelletizing or injection-molding, thus making it impossible to expect stable pelletizing properties, injection-moldability and dimensional accuracy.

PFA and FEP have melt viscosities of about $10^4$–$10^5$ poise and about $4\times10^4$–$10^5$ poise, respectively, at about 380° C. PBTE has an especially high melt viscosity, i.e. about $10^{11}$–$10^{12}$ poise at 340°–380° C. Since these resins have high melt viscosities (about $10^4$–$10^{12}$ poise) at such high temperatures, they show excellent heat resistance.

Also, due to the low friction coeffecient and excellent mold release properties of the fluororesin, it is possible to release stripping fingers formed by injection molding from a mold with minimum possibility of the fingers being subjected to undue forces or being caught by the mold. Namely, it is possible to minimize the possibility of the finger tips being damaged when they are released from the mold.

Polyimides, titanium oxide whiskers, thermosetting resins, thermoplastic resins, and solid lubricants may be mixed together by supplying them separately into a melt mixer or by dry-mixing them together in a Henschel mixer, a tumbler mixer, a ribbon blender or any other general-purpose mixer and then supplying the mixture to a melt mixer.

Anti-oxidents, heat stabilizers, UV absorbers, lubricants, release agents, coloring agents, flame-retardants, antistatic agents, crystallization promotors, etc. may be added, provided they do not have mal effects in achieving the object of the invention.

The forming material thus formed by mixing the above-mentioned substances is plasticized by heating it to about 390°–450° C. The material is then poured into a mold. After it hardens in the mold, it is removed from it. Stripping fingers of a desired shape are thus obtained.

The forming material has to be heated to such a high temperature because the melting point of the polyimide resin is rather high, i.e. about 385°–388° C. or about 380°–400° C. according to the measuring conditions. The stripping fingers may be subjected to heat treatment to further improve the resistance to thermal deformation, dimensional stability and wear resistance, and to further prolong their lives.

Such heat treatment should be carried out at about 200°–340° C., or 250°–340° C. according to molecular structure of polyimide resin, preferably about 270°–330° C. If higher than about 340° C., the stripping fingers will suffer severe thermal deformation. If lower than about 200° C., the resistance to thermal deformation will not improve.

The heat decomposition temperature of the polyimide resin is about 570° C. when its weight has reduced by 50% by weight. Thus this resin can well withstand the above-mentioned heat treatment temperature.

The duration of such heat treatment depends on the heating temperature, ranging from a minimum of two minutes to a maximum of even several weeks. It is known that there is a certain relation between the thermal deformation resistance of the stripping fingers and their density. Thus, such heat treatment should be carried out until the density of the polyimide in the material forming the stripping fingers increases by 1.5% or more.

The rate of increase in the density of the polyimide content can be calculated from the contents and densities of the respective components in the forming material and the densities of the stripping fingers before and after the heat treatment, which are measured under ASTM-D792.

The results of experiments conducted by the inventors revealed that the heat treatment time has to be 12 hours or longer if the heating temperature is 270° C., one hour or longer at 280° C., ten minutes or longer at 300 C., two minutes or longer at 330° C., and 10 minutes or longer at 340° C. Namely, the heating time is the shortest at 330° C.

If the heating temperature is lower than 260° C., the heat treatment has to be carried out for several weeks or longer. Such long heat treatment is practically impossible. If higher than 340° C., the stripping fingers will suffer severe deformation.

In order to sufficiently remove any water content in the polyimide resin, it may be kept at temperatures between about 90° and 120° C. for a while before starting the abovementioned heat treatment.

Such heat treatment of the stripping fingers may be carried out in a heating device controlled to a predetermined temperature. The heating device may be of any known type, though an electric heating type is preferable.

The fingers may be heated by circulating hot air in the heating device or flowing hot air through it.

In order for the surface of the stripping fingers to show excellent non-tackiness, fluororesin coatings should be applied to their surfaces.

It is preferable that the melting point of the fluororesin be lower than that of the thermoplastic polyimide resin. Considering the safety aspect, the former should be lower by about 10°–20° C. than the latter. For higher safety, the former is preferably about 30°–50° C. lower than the latter. By fusing a fluororesin, the surface tackiness decreases, and at the same time, the bond strength between the substrate of the stripping finger and the coating film increases.

Preferable materials for such coatings include an enamel type (organic solvent dispersion type) resin in which a perfluorocarbon resin such as tetrafluoroethylene resin (PTFE), tetrafluoroethylene-hexafluoropropylene copolymer (FEP), or tetrdfluoroethylene-perfluoroalkylvinyl ether copolymer (PFA) is dispersed in a solvent, and a low-molecular-weight fine powder (fusion type) thereof for use in powder painting.

Commercially available fluororesin coating materials include RAITY SF-301 made by Chuko Kasei Kogyo and TAHUKOTO enamel TCW-8809BK made by Daikin Kogyo as the enamel type. They may be calcined at a temperature lower than the melting point of fluororesins after mixing, as a binder resin, a polymer having the same group as the one contained in the mnaterial for stripping fingers such as polyamide-imide resins. Fusion type includes PFA-X500CL made by Mitsui Du Pont Fluorochemical and VYDAX AR made by Du Pont. If a fusion type resin coating is used, reinforcing agents, lubricants, etc. may be added to improve its wear resistance. Also, antistatic agents such as carbon black may be added to prevent electrostatic charging.

Such coatings may be applied to the surface of the fingers by spray coating, dip coating, electrostatic painting, or powder coating after applying a primer containing a binder resin to form a binding layer and applying a PFA coating layer. Spray coating is desirable because it can form the film with high accuracy.

The thickness of such coating is preferably about 5–40 $\mu$m. If thinner than about 5 $\mu$m, the wear resistance will be insufficient. If thicker than about 40 $\mu$m, it will be difficult to shape the finger tips with a desired curvature.

If a fusion type PFA resin coating is used, reinforcing agents, lubricants, etc. may be added to improve its wear resistance. Also, antistatic agents such as carbon black may be added to prevent electrostatic charging.

The abovementioned heat treatment and the baking of the fluorocarbon resin coating may be carried out simultaneously to reduce the number of heating steps to one. This improves the work efficiency and also reduces the electric power consumption of the electric furnace.

The stripping fingers according to this invention can also be used for various types of printers in which record. patterns are formed on recording media such as photosensitive materials by use of external electric signals, and the record patterns are converted to visible patterns. Such printers include electrophotographic printers, ink-jet printers, thermosensitive printers, photo-printers and electronic recording printers. Electrophotographic printing methods include Carlson method, light-charge injection method, light polarizing method, photoelectromotive force method, charge-transfer method, electrolytic electrophotographic method, electrostatic latent image photographic method, light-electrophoresis and thermoplastic method. Photo-printers include laser printers, LED (light emitting diode) printers, liquid crystal shutter printers and CRT printers. Electronic recording methods include electrostatic recording type, electrolytic recording type and discharge recording type.

Also, direct process or indirect process may be used. The static recording method be either a wet method in which oil is applied or a dry method.

The stripping fingers for a copier according to this invention are made from a matrix of a thermoplastic polyimide resin. Thus, they can be formed by hot melt forming. They are also easily injection-moldable.

The titanium oxide whisker in the matrix is easy to be filled at the finger tips, so that they can efficiently reinforce the finger tips and also improve the heat resistance at them.

Ten-odd percent of the four-radial-needle type zinc oxide whiskers are broken into individual tapered needles; when mixing and forming the resin composition. Such tapered needles are less likely to be pulled out of the resin matrix even if they are exposed to the sliding surface. Also, they can easily move to the finger tips by being orientated, so that they can effectively reinforce the finger tips.

The polyamide resin powder contained in the composition increases the wear resistance. They will drop off if exposed at the sliding surface and hardly damage the soft mating member even if they are exposed at the sliding surface.

Thus, the stripping fingers made of polyimide resin have excellent wear resistance and hardly damage the mating member. Also, they will show excellent shock resistance and fatigue resistance when subjected to temperatures higher than about 200° C.

By adding fillers having heat decomposition temperatures higher than the melting point of the polyimide resin, it is possible to further improve the heat resistance. By adding solid lubricants, the non-tackiness and friction properties will improve.

Other features and objects of the present invention will become apparent from the following description made with reference to the accompanying drawings, in which:

DETAILED DESCRIPTION OF THE PREFERRED EMBODIMENT

The materials used in Examples 1–6 and Comparative Examples 1–5 are shown below. The contents of the materials are all indicated in parts by weight.

(1) Polyimide AURAM #450 made by Mitsui Toatsu Chemical
(2) Titanium oxide whiskers FTL300 made by Ishihara Sangyo
(3) Aluminum borate whiskers ALBOREX Y made by Shikoku Kasei Kogyo
(4) Potassium titanate whiskers TISMO N made by Otsuka Chemical
(5) Phenolic resin BELLPEARL C-2000 made by Kanebo
(6) Tetrafluoroethylene resin (PTFE) KTL-610 made by Kitamura
(7) Primer liquid for coating MP-902AL made by Mitsui Du Pont Fluorochemical
(8) PFA liquid for coating X500CL made by Mitsui Dupont Fluorochemical (Examples 1–5 and Comparative Examples 1–5)

The materials shown in Tables 1 and 2 are prepared and dry-mixed together by the amounts shown in Tables 1 and 2. The mixtures thus obtained were fed into a twin-screw melt extruder (made by Ikegai Tekko : PCM-30) and pelletized by kneading and extruding them while heating to about 390°–400° C. The pellets obtained were supplied into an injection molder to injection-mold them with the cylinder temperature at 390°–400° C., injection pressure at about 1000 kg/cm$^2$, and the mold temperature at about 180° C. to provide articles having the shape of stripping fingers. The articles obtained were heat-treated for five hours at; about 320° C. Then, a primer liquid (7) for coating was applied to the articles by spray coating and dried. A PFA coating liquid (8) was further applied by spray coating. The coating thus provided on the articles were fused to the articles by heating them for about 30 minutes at about 340° C.

The test pieces thus obtained were tested for 1) wear resistance, 2) shock resistance, 3) fatigue resistance, and 4) whisker contents at the finger tips. The results of measurement are shown in Tables 1 and 2. Measurements were made in the following manner.

1) Wear resistance

Figure 1A:
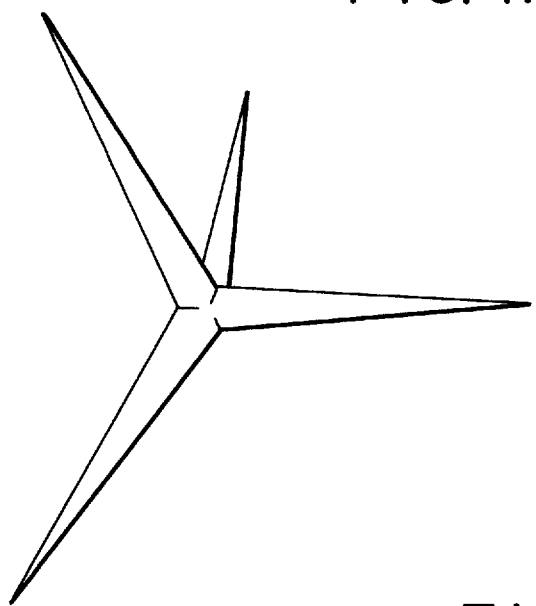
FIG. 1A is an enlarged perspective view showing the crystal structure of a four-radial-needle type zinc oxide whisker.
Figure 1B:
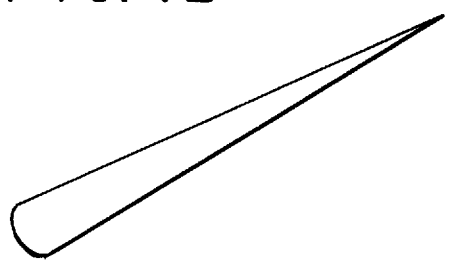
FIG. 1B is an enlarged perspective view showing one broken needle of the zinc oxide whisker of FIG. 1A.
Figure 2:
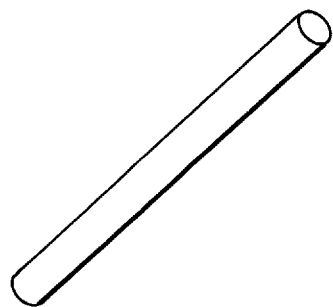
FIG. 2 is an enlarged perspective view of a single-needle type filler.
Figure 3A:
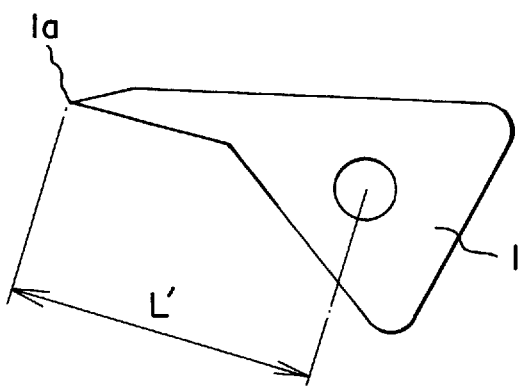
FIG. 3A is a side view of a stripping finger for a copier used in the wear resistance test.
Figure 3B:
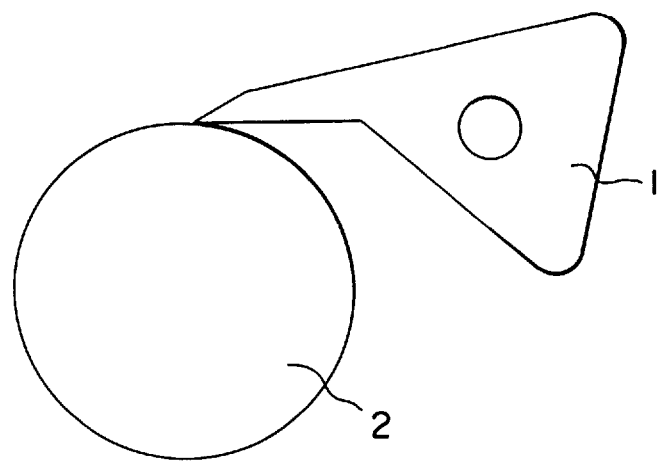
FIG. 3B is a schematic side view showing how the wear resistance test is done.

As shown in FIGS. 3A, 3B, each specimen of stripping finger 1 was brought into and kept in sliding contact with an S45C roller 2 rotating at 148 rpm under the load of 20 gf for about 350 hours at 196°±3° C. We measured the difference (mm) in distance L' between the center of the hole and the finger tip before and after the test.

The roller used in this test simulates a roller in the image fixing device of a dry static copier. In this environment, the stripping fingers are used under rather severe conditions. But the tests may be made under different conditions.

2) Shock resistance

Figure 4:
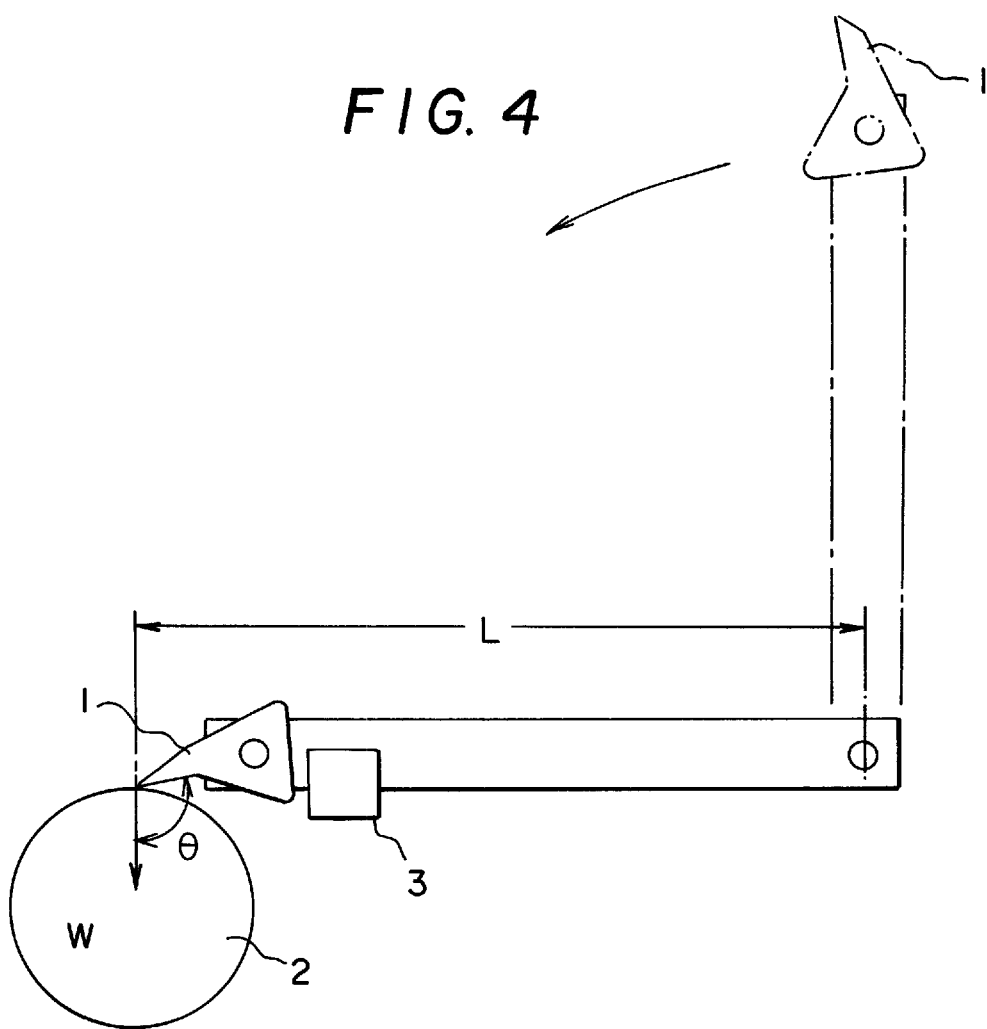
FIG. 4 is a schematic side view of a shock resistance tester.

We measured the shock resistance of each stripping finger at its tip with a high impact shock tester (shown schematically in FIG. 4). Namely, the stripping finger 1 was mounted on one end of a lever (length L=85 mm) pivotable about the other end so that when it turns from its erect position to horizontal position by gravity, the tip of the stripping finger will collide with the roller 2 under the load (W) of 20 gf, the contact angle (θ) being about 100°. The number of collisions were counted until the stripping finger 1 chipped. The maximum number of collisions was 20.

3) Fatigue resistance

Figure 5:
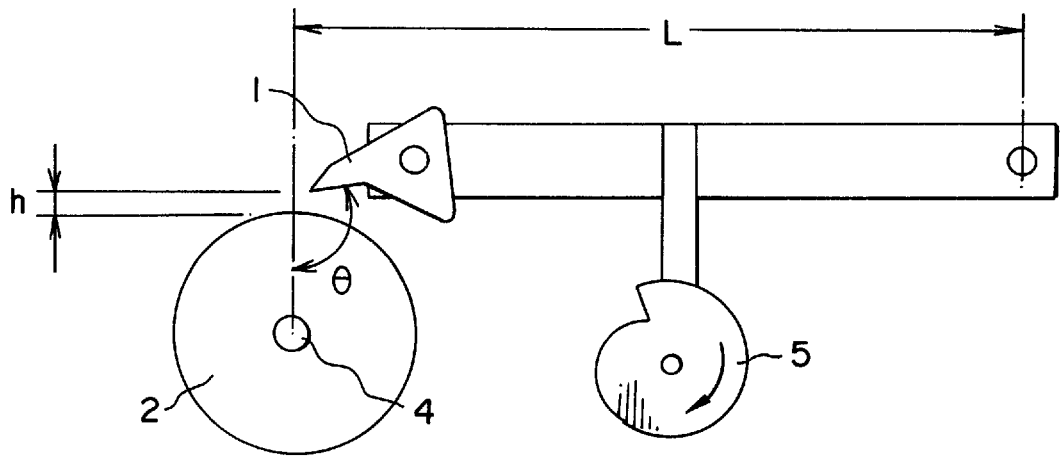
FIG. 5 is a schematic side view of a fatigue resistance tester.
Figure 6:
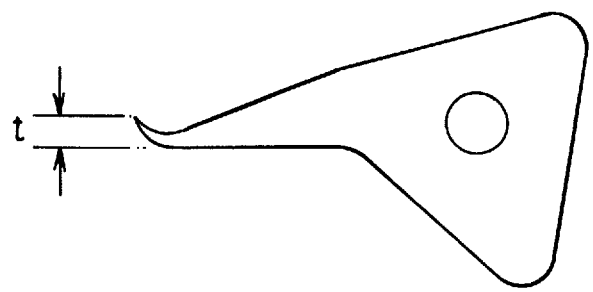
FIG. 6 is a side view of a stripping finger for a copier showing the amount of deformation t at the finger tip.

Measurement was made of the fatigue resistance of each stripping finger at its tip with a shock fatigue tester (shown schematically in FIG. 5). Namely, the stripping finger 1 was mounted on one end of a lever pivotable about the other end so as to repeatedly drop by gravity the stripping finger from the height h=1 mm and collide it against the roller 2 by rotating a cam 5 kept in contact with the underside of the lever. During this test, the surface of the roller 2 was heated to about 200° C. with a heater 4. The tip of the stripping finger was brought into contact with the roller under load (W) of 20 gf at the contact angle (θ) of about 100°. The fatigue resistance was calculated in terms of the average of the amounts of deformation t (in μm see FIG. 6) when the finger tip has collided with the roller 100000 times.

4) Whisker content at the finger tip

After mirror-finishing the sides of each stripping finger at its tip by means of a lapping machine, we observed how much the whisker is filled under a scanning electron microscope (SEM). In the table, ☆ indicates that whisker is filled in sufficient amount, ○ that it is filled in medium amount, and Δ that it is little filled.

As will be apparent from Tables 1 and 2, Comparative Example 1, whose content of titanium oxide whisker was below the predetermined range, was inferior in all of the test items 1)–4). On the other hand, Comparative Example 2, of which the titanium oxide whisker content was above the range, was so high in viscosity that forming that injection-molding was impossible. Comparative Examples 3–5, which contain aluminum borate whiskers, and/or potassium titanate whiskers in place of titanium oxide whiskers, were low in reinforcing effect. Also, whisker contents at the: finger tips were too low.

In contrast, Examples 1–6 of the invention, which satisfy all the requirements, showed excellent results in all of the test items including formability, wear resistance, shock resistance, fatigue resistance, and this whisker contents at finger tip.

The materials used in Examples 7–14 and Comparative Examples 6–9 are shown below.

(9) Polyimide New-TPI #450 made by Mitsui Toatsu Chemical

(10) Zinc oxide whiskers Panatetra (PH 7.0) made by Matsushita AMTEC

(11) Potassium titanate whiskers TISMO-D102 (PH9.0) made by Otsuka Chemical

(12) Aluminum borate whiskers ALBOREX -5 (PH 7.5) made by Shikoku KaSei (Examples 7–14 and Comparative Examples 6–9)

The materials shown in Tables 3 and 4 were added by the amounts shown in Tables 3 and 4 to form test specimens in exactly the same way as in Example 1.

The test pieces obtained were measured for 1) wear resistance, 2) shock resistance, 3) fatigue resistance, 4) whisker contents at the finger tips, and 5) formability. The results of measurement are shown in Tables 1 and 2. Tests 1)–4) were carried out in exactly the same manner as described above except that the number of collisions in the shock resistance test 2) was limited to 10. Formability was measured in the following manner.

5) Formability 50 stripping fingers formed in the above manner were viewed from one side of their tips with a projector to measure the curvatures at their tips (see FIG. 3A). From the curvatures obtained, we calculated the average radian of curvature R ($\mu$m).

As will be apparent from Tables 3 and 4, for Comparative Example 7 using potassium titanate whisker, whose pH level was above (i.e. to the alkaline side of) the predetermined range, forming was impossible. Comparative Examples 6 and 9, in which the contents of zinc oxide whiskers were out of the predetermined range, and Comparative Example 8, which did not contain such whiskers at all, were all unsatisfactory in wear resistance and also the content of whiskers at the finger tips was scarce.

In contrast, Examples 7–14, which satisfy all the requirements, showed excellent results in all of the test: items.

In Examples 15–22 and Comparative Example 10–13, besides the materials mentioned above, the following material was used:

(13) Aromatic polyamide resin powder (aramid powder) Aramica powder ARP-P (average particle dia. 20 $\mu$m) made by ASAHI KASEI (Examples 15–22 and Comparative Examples 10–13)

The materials shown in Tables 5 and 6 were added by the amounts shown in these Tables to form test specimens in exactly the same way as in Examples 1–6.

The test pieces obtained were measured for 1) wear resistrance, 2) shock resistance, 3) fatigue resistance, 4) whisker contents at the finger tips, and 5) formability. The results of measurement are shown in Tables 5 and 6. These tests were carried out in exactly the same manner as described above except that the number of collisions in the shock resistance test 2) was limited to 10.

As will be apparent from Tables 5 and 6, in Comparative Examples 11 and 12, in which the content of zinc oxide whiskers or aramid resin powder was higher than the predetermined range, forming was impossible. Comparative Example 10, in which the content of zinc oxide whiskers were lower than the predetermined range, and Comparative Example 13, which did not contain such whiskers at all, were unsatisfactory in wear resistance and other tests. The contents of whiskers at the tips were also low.

In contrast, Examples 15–22, which satisfy all the requirements, showed excellent results in all of the test items, Most notably, their wear resistance was so high that their livers were about three to four times longer than those of Comparative Examples, which represent the prior art.

In Examples 23–33 and Comparative Example 14–19, besides the materials mentioned above, the following material was used:

(13) Polyetherimide resin ULTEM made by General Electric (Examples 23–33 and Comparative Examples 14–19)

The materials shown in Tables 7 and B were added by the amounts shown in these Tables and dry-mixed together. The mixtures thus obtained were fed into a twin-screw melt extruder (made by Ikegai Tekko: PCM-30) and pelletized by kneading and extruding them while heating them to about 340°–400° C. The pellets obtained were supplied into an injection molder to injection-mold them with the cylinder temperature at 360°–400° C., injection pressure at about 1000 kg/cm$^2$, and the mold temperature at 190° C. to provide articles having the shape of stripping fingers The articles obtained were heated for five hours at 320° C. Then, a primer liquid (7) for coating was applied to the articles by spray coating and dried. A PFA coating liquid (8) was further applied by spray coating. The coating thus provided on the articles were fused to the articles by heating them for 30 minutes at 340° C.

The test pieces thus obtained were measured for 1) wear resistrance, 2) shock resistance, 3) fatigue resistance, 4) whisker contents at the finger tips, and 5) formability. The results of measurement are shown in Tables 7 and 8. These tests were carried out in exactly the same manner as described above except that the number of collisions in the shock resistance test 2) was limited to 10.

As will be apparent from Tables 7 and 8, with Comparative Examples 16 and 17, in which the content of titanium oxide whiskers, zinc oxide whiskers or aramid resin powder was higher than the predetermined range, forming was impossible. Comparative Examples 14, 15, in which the content of titanium oxide whiskers or zinc oxide whiskers was lower than the predetermined range, and Comparative Example 19, what did not contain such whiskers at all, were unsatisfactory in wear resistance, shock resistance and fatigue resistance. The content of whiskers at the tips were also low.

In contrast, Examples 23–33, which satisfy all the requirements, showed excellent results in all of the test items. Most notably, their wear resistance was so high that their lives were about three to four times longer than those of Comparative Examples 14, 15 and 19.

As described above, the stripping fingers for a copier according to this invention is formed from a polyimide resin composition comprising a matrix of a thermoplastic polyimide resin with a predetermined amount of titanium oxide whiskers or zinc oxide whiskers added thereto. This composition has high melt formability and particularly excellent injection-moldability. The content of titanium oxide whisker is filled at the finger tips in sufficient amount. The fingers thus formed show excellent wear resistance, shock resistance and fatigue resistance at their tips.

By adding a filler having a higher heat decomposition temperature than the melting point of the polyimide resin forming the matrix, it is possible to improve the heat resistance.

Also, solid lubricants may be added without impairing the abovementioned effects.

By adding both solid lubricants and single-needle type fillers, it is possible to further improve the above properties.

Stripping fingers formed from a resin composition containing a predetermined amount of aromatic polyamide resin powder will be less likely to damage even a soft mating member such as a PFA-coated roller. Such stripping fingers will also show excellent shock resistance and fatigue resistance.

By adding solid lubricants, it is possible to further improve the non-tackiness of the stripping fingers It is also possible to further improve the friction properties and non-tackiness of stripping fingers by providing fluororesin coatings thereon.

[TABLE 1]

| Material | Number | Example 1 | 2 | 3 | 4 | 5 | 6 |
|---|---|---|---|---|---|---|---|
| Polyimide | (1) | 90 | 50 | 60 | 60 | 60 | 60 |
| Titanium oxide whisker | (2) | 10 | 50 | 30 | 20 | 20 | 30 |
| Aluminium borate whisker | (3) | — | — | — | 10 | — | — |
| Potassium titanate whisker | (4) | — | — | — | — | 10 | — |
| Phenol resin | (5) | — | — | 10 | 10 | 10 | — |
| PTFE | (6) | — | — | — | — | — | 10 |
| ① Wear resistance | (mm) | 0.30 | 0.25 | 0.26 | 0.25 | 0.24 | 0.27 |
| ② Shock resistance | (time) | 17 | 18 | 20 | 19 | 20 | 20 |
| ③ Fatigue resistance | (μm) | 27 | 22 | 20 | 23 | 21 | 21 |
| ④ Filling amount at finger tip | | ○ | ☆ | ☆ | ☆ | ☆ | ☆ |

[TABLE 2]

| Material | Number | Comparative Example 1 | 2 | 3 | 4 | 5 |
|---|---|---|---|---|---|---|
| Polyimide | (1) | 95 | 40 | 70 | 70 | 60 |
| Titanium oxide whisker | (2) | 5 | 60 | — | — | — |
| Aluminium borate whisker | (3) | — | — | 30 | — | 30 |
| Potassium titanate whisker | (4) | — | — | — | 30 | — |
| Phenol resin | (5) | — | — | — | — | 10 |
| PTFE | (6) | — | — | — | — | — |
| ① Wear resistance | (mm) | 0.52 | * | 0.42 | 0.38 | 0.45 |
| ② Shock resistance | (time) | 8 | — | 10 | 14 | 13 |
| ③ Fatigue resistance | (μm) | 45 | — | 37 | 33 | 40 |
| ④ Filling amount at finger tip | | Δ | — | Δ | Δ | Δ |

*Not formable

[TABLE 3]

| Material | Number | Example 7 | 8 | 9 | 10 | 11 | 12 | 13 | 14 |
|---|---|---|---|---|---|---|---|---|---|
| Polyimide | (9) | 90 | 50 | 80 | 60 | 66 | 75 | 75 | 50 |
| Zinc oxide whisker | (10) | 10 | 60 | 20 | 20 | 20 | 20 | 15 | 20 |
| Potassium titanate whisker | (3) | — | — | — | 20 | — | — | — | — |
| Potassium titanate whisker | (11) | — | — | — | — | — | — | — | — |
| Aluminium borate whisker | (12) | — | — | — | — | 20 | — | — | — |
| Phenol resin | (5) | — | — | — | — | 5 | 5 | 5 | 30 |
| PTFE | (6) | — | — | — | — | — | — | 5 | — |
| ˜Wear resistance (mm) | | 0.29 | 0.25 | 0.28 | 0.27 | 0.27 | 0.28 | 0.29 | 0.26 |
| ˜Shock resistance (time) | | 9 | 8 | 10 | 9 | 9 | 10 | 10 | 7 |
| ˜Fatigue resistance (μm) | | 25 | 16 | 22 | 17 | 22 | 19 | 22 | 25 |
| ˜Filling amount at finger tip | | ○ | ☆ | ☆ | ☆ | ☆ | ☆ | ○ | ○ |
| ˜Formability (μm) | | 12 | 48 | 20 | 47 | 52 | 21 | 12 | 25 |

[TABLE 4]

| Material | Number | Comparative example 6 | 7 | 8 | 9 |
|---|---|---|---|---|---|
| Polyimide | (9) | 80 | 60 | 95 | 60 |
| Zink oxide whisker | (10) | — | 20 | 5 | — |
| Potassium titanate whisker | (3) | 20 | — | — | 20 |
| Potassium titanate whisker | (11) | — | 20 | — | — |
| Aluminium borate whisker | (12) | — | — | — | 20 |
| Phenol resin | (5) | — | — | — | — |
| PTFE | (6) | — | — | — | — |
| ① Wear resistance | (mm) | 0.85 | — | 1.23 | 0.79 |
| ② Shock resistance | (time) | 6 | — | 2 | 5 |
| ③ Fatigue resistance | (μm) | 38 | — | 43 | 40 |
| ④ Filling amount at finger tip | | Δ | — | Δ | Δ |
| ⑤ Formability | (mm) | 22 | * | 10 | 26 |

*Not formable

[TABLE 5]

| Material | Number | \multicolumn{8}{c}{Example} | | | | | | | |
|---|---|---|---|---|---|---|---|---|---|
| | | 15 | 16 | 17 | 18 | 19 | 20 | 21 | 22 |
| Polyimide | (9) | 50 | 70 | 70 | 80 | 60 | 70 | 60 | 70 |
| Zinc oxide whisker | (10) | 40 | 27 | 15 | 10 | 30 | 17 | 20 | 15 |
| Aramid powder | (11) | 10 | 3 | 15 | 10 | 5 | 3 | 15 | 5 |
| Potassium titanate whisker | (4) | — | — | — | — | — | 10 | — | — |
| Phenol resin | (5) | — | — | — | — | 5 | — | — | — |
| PTFE | (6) | — | — | — | — | — | — | 5 | 10 |
| ˆˆWear resistance (mm) | | 0.20 | 0.23 | 0.21 | 0.25 | 0.21 | 0.24 | 0.20 | 0.27 |
| ˆˆShock resistance (time) | | 10 | 10 | 10 | 10 | 10 | 10 | 10 | 10 |
| ˆˆFatigue resistance ($\mu$m) | | 15 | 19 | 22 | 24 | 19 | 19 | 21 | 27 |
| ˆˆFilling amount at finger tip | | ☆ | ☆ | ○ | ○ | ☆ | ○ | ☆ | ○ |
| ˆˆFormability ($\mu$m) | | 48 | 30 | 28 | 20 | 34 | 32 | 38 | 28 |

[TABLE 6]

| Material | Number | \multicolumn{4}{c}{Comparative example} | | | |
|---|---|---|---|---|---|
| | | 10 | 11 | 12 | 13 |
| Polyimide | (1) | 85 | 45 | 60 | 75 |
| Zink oxide whisker | (10) | 5 | 45 | 20 | — |
| Aramid powder | (13) | 10 | 10 | 20 | 5 |
| Potassium titanate whisker | (4) | — | — | — | 20 |
| Phenol resin | (5) | — | — | — | — |
| PTFE | (6) | — | — | — | — |
| ① Wear resistance | (mm) | 0.92 | — | — | 0.85 |
| ② Shock resistance | (time) | 6 | — | — | 8 |
| ③ Fatigue resistance | ($\mu$m) | 40 | — | — | 34 |
| ④ Filling amount at finger tip | | Δ | — | — | Δ |
| ⑤ Formability | (mm) | 10 | * | * | 18 |

*Not formable

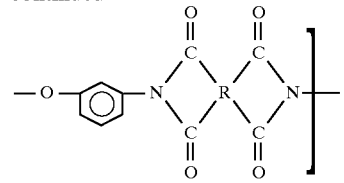

(where X indicates a direct bond or a bivalent group selected from the group consisting of a bivalent hydrocarbon group having 1–10 carbon atoms, a hexafluorinated isopropylidene group, a carbonyl group, a thio group, and a sulfonic group; and R indicates a tetravalent group selected from the group consisting of an aliphatic group having two or more carbon atoms, a cyclic aliphatic group, a monocyclic aromatic group, a condensed polycyclic aromatic

[TABLE 7]

| Material | Number | \multicolumn{11}{c}{Example} | | | | | | | | | | |
|---|---|---|---|---|---|---|---|---|---|---|---|---|
| | | 23 | 24 | 25 | 26 | 27 | 28 | 29 | 30 | 31 | 32 | 33 |
| Polyetherimid | (14) | 50 | 50 | 80 | 80 | 70 | 70 | 60 | 70 | 70 | 60 | 70 |
| Zinc oxide whisker | (2) | 40 | — | 10 | — | 27 | — | — | 17 | — | 20 | — |
| Zinc oxide whisker | (10) | — | 40 | — | 10 | — | 15 | 30 | — | 15 | — | 15 |
| Aramid whisker | (13) | 10 | 10 | 10 | 10 | 3 | 15 | 5 | 3 | 5 | 15 | 5 |
| Potassium titanate whisker | (4) | — | — | — | — | — | — | — | 10 | 10 | — | — |
| Phenol resin | (5) | — | — | — | — | — | — | 5 | — | — | — | — |
| PTFE | (6) | — | — | — | — | — | — | — | — | — | 5 | 10 |
| ˆˆWear resistance (mm) | | 0.21 | 0.20 | 0.26 | 0.25 | 0.25 | 0.21 | 0.21 | 0.26 | 0.24 | 0.21 | 0.27 |
| ˆˆShock resistance (time) | | 10 | 10 | 10 | 10 | 10 | 10 | 10 | 10 | 10 | 10 | 10 |
| ˆˆFatigue resistance ($\mu$m) | | 20 | 15 | 26 | 24 | 21 | 22 | 19 | 21 | 18 | 23 | 27 |
| ˆˆFilling amount at finger tip | | ☆ | ☆ | ○ | ○ | ☆ | ☆ | ☆ | ○ | ○ | ☆ | ○ |
| ˆˆFormability ($\mu$m) | | 45 | 48 | 22 | 20 | 32 | 28 | 34 | 35 | 34 | 35 | 28 |

What is claimed is:

1. Stripping fingers comprising:

a resin composition comprising 50–95% by weight of a thermoplastic polyimide resin comprising repeating units represented by the following formula (1):

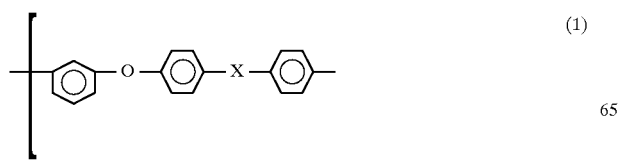

group, and a non-condensed polycyclic aromatic group made up of aromatic groups coupled together directly or through crosslinking agents), and 5–50% by weight of titanium oxide whiskers, said whiskers having an average fiber diameter in the range of from 0.05 $\mu$m to 3 $\mu$m and an average fiber length in the range of from 1 $\mu$m to 100 $\mu$m.

2. Stripping fingers comprising:

a resin composition comprising 50–80% by weight of a thermoplastic polyimide resin comprising repeating units represented by the following formula (1):

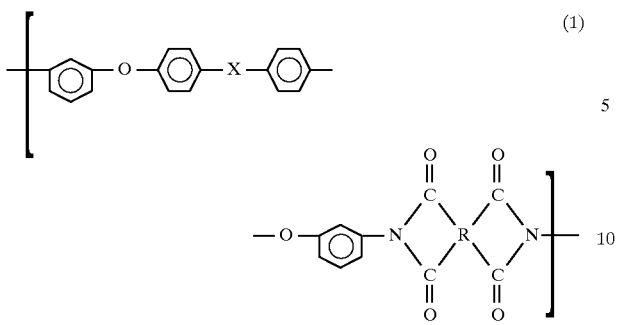

(where X indicates a direct bond or a bivalent group selected from the group consisting of a bivalent hydrocarbon group having 1–10 carbon atoms, a hexafluorinated isopropylidene group, a carbonyl group, a thio group, and a sulfonic group; and R indicates a tetravalent group selected from the group consisting of an aliphatic group having two or more carbon atoms, a cyclic aliphatic group, a monocyclic aromatic group, a condensed polycyclic aromatic group, and a non-condensed polycyclic aromatic group made up of aromatic groups coupled together directly or through crosslinking agents), 10–40% by weight of titanium oxide whiskers, said whiskers having an average fiber diameter in the range of from 0.05 $\mu$m to 3 $\mu$m and an average fiber length in the range of from 1 $\mu$m to 100 $\mu$m, and 2–15% by weight of an aromatic polyamide resin.

3. Stripping fingers as claimed in claim 1 or 2, wherein said titanium oxide whiskers are a single-needle type, filler having a pH value not exceeding 8.

4. Stripping fingers as claimed in claim 1 or 2, wherein said resin composition further comprises 3–30% by weight of a solid lubricant.

5. Stripping fingers comprising:
a resin composition comprising 50–95% by weight of a thermoplastic polyimide resin comprising repeating units represented by the following formula (1):

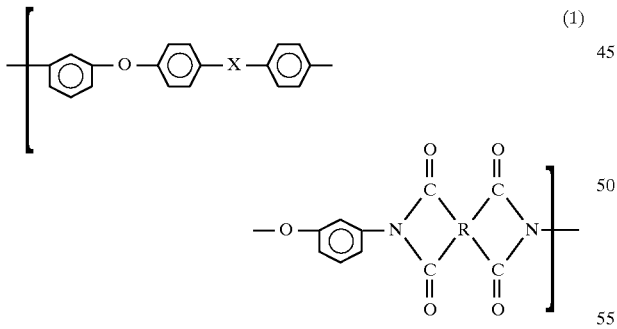

(where X indicated a direct bond or a bivalent group selected from the group consisting of a bivalent hydrocarbon group having 1–10 carbon atoms, a hexafluorinated isopropylidene group, a carbonyl, a thio group, and a sulfonic group; and R indicates a tetravalent group selected from the group consisting of a aliphatic group having two or more carbon atoms, a cyclic aliphatic group, a momocyclic aromatic group, a condensed polycyclic aromatic group, and a non-condensed polycyclic aromatic group made up of aromatic groups coupled together directly or through crosslinking agents), 5–50% by weight of titanium oxide whiskers, said whiskers having an average fiber diameter in the range of from 0.05$\mu$m to 3 $\mu$m and an average fiber length in the range of from 1 $\mu$m to 100 $\mu$m, and 3–30% by weight of a solid lubricant,
wherein the total amount of said soled lubricant and said titanium oxide whiskers is 10–60% by weight of the entire resin composition.

6. Stripping fingers as claimed in any of claims 1, 2 and 5, and wherein said resin composition further comprises 3–30% by weight of a filler having a thermal decomposition temperature higher than the melting point of said thermoplastic polyimide resin.

7. Stripping fingers as claimed in claim 6 wherein said filler is a thermoplastic resin or a thermosetting resin which is different from said thermoplastic polyimide resin.

8. Stripping fingers as claimed in claim 7 wherein said filler thermoplastic resin is a fluororesin.

9. Stripping fingers as claimed in any of claims 1, 2 and 5, further comprising a coating of fluororesin on said fingers.

10. Stripping fingers as claimed in claim 9 wherein said fluororesin is a perfluororesin.

11. Stripping fingers as claimed in claim 10 wherein said perfluororesin is a tetrafluoroethylene-perfluoroalkylvinylether copolymer.

12. A method of manufacturing stripping fingers, comprising the steps of injection-molding the resin composition claimed in any of claims 1, 2, and 5, into the shape of stripping fingers, and post heating said injection-molding formed stripping fingers at 200°–340° C. until the density of said polyimide resin composition stripping fingers increases by at least 1.5% as compared to the density of an article molded in the same way from the same composition which had not been so post heated.

13. Stripping fingers as claimed in claim 5 wherein said solid lubricant comprises at least one member selected. from the group consisting of graphite, graphite fluoride, molybdenum disulfide and fluororesin.

14. Stripping fingers as claimed in claim 13 wherein said fluororesin comprises polytetrafluoroethylene.

15. A method of manufacturing stripping fingers as claimed in claim 12 wherein said injection molding formed stripping fingers are heated to about 250° to 340° C. an amount sufficient to increase their density.

* * * * *